Dec. 22, 1936.  T. H. SCHOEPF ET AL  2,065,345
ARTICULATED CAR
Filed March 21, 1935    2 Sheets-Sheet 1
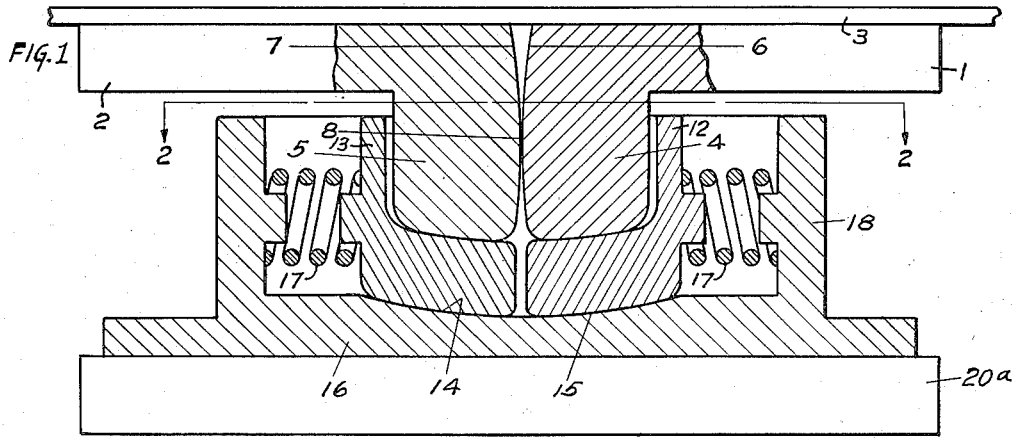
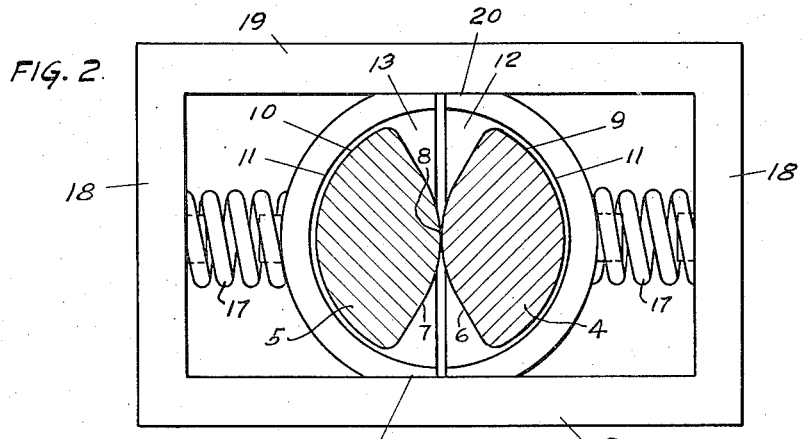
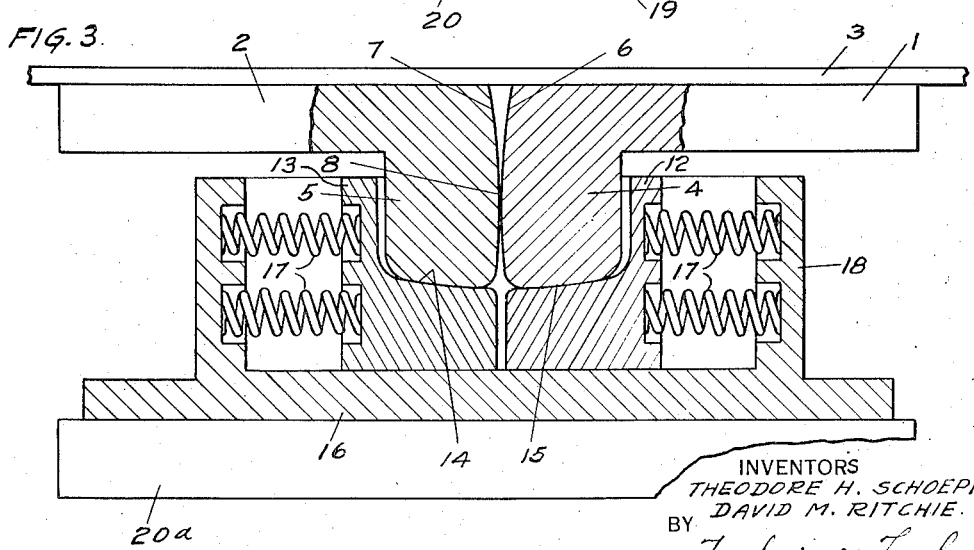
INVENTORS
THEODORE H. SCHOEPF,
DAVID M. RITCHIE.
BY
Toulmin & Toulmin
ATTORNEYS Dec. 22, 1936.  T. H. SCHOEPF ET AL  2,065,345
ARTICULATED CAR
Filed March 21, 1935  2 Sheets-Sheet 2
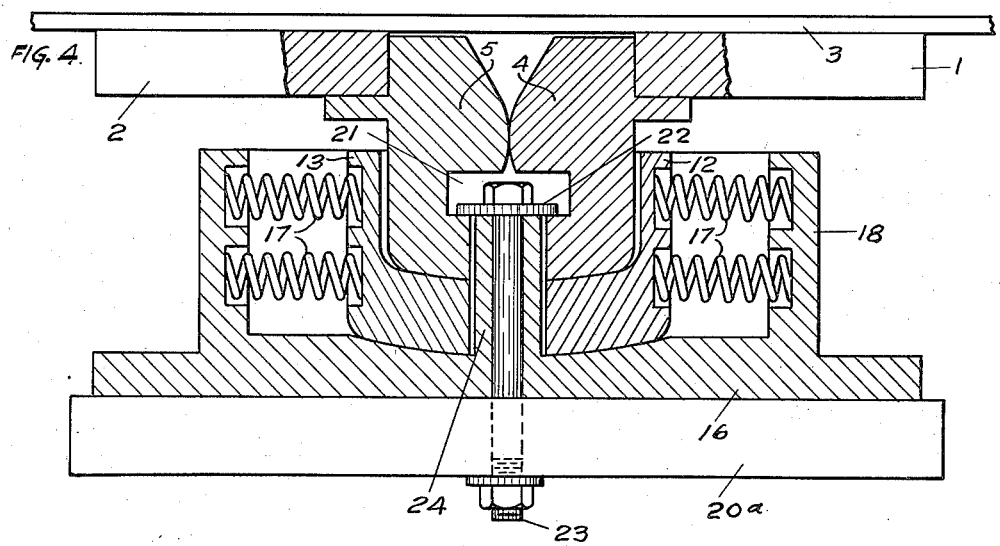
INVENTORS
THEODORE H. SCHOEPF,
DAVID M. RITCHIE.
BY
*Jouhnin & Jouhnin*
ATTORNEYS.

Patented Dec. 22, 1936

2,065,345

UNITED STATES PATENT OFFICE 2,065,345

ARTICULATED CAR

Theodore H. Schoepf and David M. Ritchie, Cincinnati, Ohio, assignors to The Cincinnati Traction Building Co., Cincinnati, Ohio, a corporation of Ohio Application March 21, 1935, Serial No. 12,225

10 Claims. (Cl. 105—4)

Our invention relates to articulated cars.

It is the particular object of the invention to provide shock absorbing means between the trunnions on the ends of the articulated cars and the truck and truck bolster supporting the trunnions.

Heretofore, in non-articulated cars the shock of stopping and starting has been absorbed by the couplers through springs and the like. But with the adoption of the articulated car construction, this shock absorbing means was eliminated and all shocks were transmitted directly through the car bodies either directly to the common truck or to the trunnions, center plates, the truck bolster and the trucks.

It is a further object of this invention to permit of relative longitudinal movement of the socket plates with respect to the bolster of a truck when the socket plates are carrying articulated trunnions, and it is an object to provide means of restraining this movement at the times when braking of the train takes place.

It is an object to effect this restraint of the movement of the socket plates in conjunction with a magnetic track brake system or with the magnetic apparatus used therefor.

Referring to the drawings, Figure 1 is a side elevation partially in section showing the adjacent car platforms having depending trunnions engaging with one another and a bifurcated movable socket or center plate yieldingly mounted within a center plate carrier on a bolster which is diagrammatically shown.

Figure 2 is a section on the line 2—2 of Figure 1.

Figure 3 is a view similar to Figure 1 illustrating a modification in which the bifurcated center plate moves on a flat surface of the carrier plate.

Figure 4 is a similar view to Figure 1 except that it shows the employment of separable trunnions and a retaining center bolt for retaining the trunnions from detachment from their bifurcated socket.

Referring to the drawings, 1 is a car platform and 2 is an adjacent car platform. 3 designates the overlapping platform of a communicating vestibule. The car platforms are provided with integral, downwardly extending trunnions 4 and 5 having engaging arcuate faces 6 and 7 that are adapted to rock upon one another when the bodies assume different horizontal planes with respect to one another or swing laterally with respect to one another. The point of contact 8 between the abutting trunnions shifts according to the rocking movement of the car platforms. The rear surfaces of the trunnions are semi-circular as at 9 and 10. They conform to the interior surfaces 11 of the halves 12 and 13 constituting the trunnion sockets. These trunnion sockets are provided with arcuate bottoms 14 resting in an arcuate depression 15 in the center plate carrier 16. The halves of the socket plates are maintained in their normal adjacent position by the bumper springs 17 interposed between the socket half and the vertical wall 18 of the center plate carrier 16. The vertical wall 18 at either end of the center plate carrier is joined on its ends with the other corresponding wall of the side walls 19. These side walls act as guiding walls for the flat side faces 20 of the halves of the socket trunnion.

Referring to Figure 3, which is a modification of Figure 1, the construction is the same save the bottoms of the socket halves are flat, engaging with the flat bottom surface of the center plate carrier 16. A plurality of springs 17 are used between the socket halves and the interior of the end wall 18 of the center carrier plate.

In all views 20a designates the bolster of a common supporting truck for the respective ends of the car platforms 1 and 2.

Figure 4 is a modification showing independent trunnions. These trunnions are cut away at 21 to receive a retaining plate 22 held on the end of a king bolt 23 that is utilized to retain the trunnions, the bifurcated center plates and the center plate carrier on the bolster. For this purpose the center plate carrier or socket carrier has a column extension 24 though which the bolt 23 is projected and guided.

Up to this point, the means of resistance to the movement of the halves of the socket plates or center plates has been due to the agency of springs 17. Equivalent hydraulic mechanism (not shown) may also be employed.

Referring to Figure 4 of the drawings, and to the removal of both trunnions at the same time, or one trunnion at a time, the following is the procedure: to remove both trunnions at the same time, the nut on the lower end of the king bolt 23 is removed so that, when the cars are raised by lifting jacks, the trunnions move upwardly and out of the socket plates, taking the bolt with them. When one trunnion, say trunnion 4, is to be removed, should there be occasion to do so, which is not likely, the brakes are applied on the car 2 as numbered in Figure 4, and the locomotive or other propelling apparatus is caused to pull slightly on car 3. This will move the trunnion 4 against its socket plate and move the latter sufficiently to disengage it from the retaining plate 22. This movement temporarily compresses the springs 17. Car 3 is then jacked up and the trunnion 4 is thereby lifted out of the socket plate. These are shop operations, and take place when the train undergoes repairs.

Referring to the particular object of this invention referred to in the opening of this specification, and further amplifying that object and the results that flow therefrom, we now describe one of the principal functional results flowing from the shock absorbing means between the trunnions on the one part and the sockets, in which the trunnions are mounted, on the other part. The independent longitudinal movability of one socket and one trunnion, with respect to the other socket and its trunnion, and the longitudinal movability of the socket plates with respect to the socket plate carrier, result in overcoming of the inertia of one car at a time by the locomotive or other train motive power. Suppose that the righthand car, as viewed in Figure 1, is drawn forward by the motive power. Such forward movement is permitted by the trunnion and socket plate of that car compressing the spring 17 and taking up the slack that normally exists between such socket plate and trunnion and the forward portion of the center plate 16, 18.

When the cars move far enough to take up this slack, then further forward movement will begin to move the second car to the left, as seen in Figure 1. The forward start and movement of the second car results from the truck and center plate having compressed the rear spring 17, which in turn transmits this pull to the lefthand socket plate and trunnion, and thence to the second car. However, this movement of the second car does not begin until the slack between its trunnion and socket plate on the one part and the center plate 16 on the other part is taken up. Thus, the motor will first start the front or forward car and move it until its slack is taken up, when the slack between the center plate 16 on the one part and the socket plate and trunnion of the second car on the other part will also be taken up. Then, the second car itself will move forward.

These operations are repeated by each of the succeeding articulations at the succeeding adjacent ends of each two cars. This results in the second car, by its forward movement, likewise taking up the two slacks as did the forward movement of the first car take up the two slacks. This goes on through the train, with the ultimate result that a motor or locomotive need only be powerful enough to move one car at a time to overcome its inertia and put that car in motion, and then separately start each succeeding car.

It will be understood that we desire to comprehend within our invention such modifications as may be clearly embraced within the claims and scope of our invention.

Having thus fully described our invention, what we claim as new and desire to secure by Letters Patent, is:

1. In a railway car articulation, adjacent car platforms having trunnions associated therewith, said trunnions being adapted for engagement with one another and for relative vertical and lateral movement, longitudinally movable sockets for said trunnions, means for yieldingly resisting movement of said sockets, and means for guiding said sockets for longitudinal movement.

2. In a railway car articulation, adjacent car platforms having trunnions, said trunnions being adapted to engage one another and to have lateral and vertical relative movement, longitudinally movable sockets for said trunnions, means for yieldingly resisting movement of said sockets, means for guiding said sockets for longitudinal movement, and means for retaining said trunnions in said sockets.

3. In combination in an articulation, car platforms having trunnions with arcuate engaging faces adapted to permit vertical and horizontal movement of the car platforms, semi-circular receiving sockets for said trunnions adapted to permit of said respective platform movements, a socket plate carrier, and yielding means between said sockets and said carrier for resisting the independent longitudinal movement of the trunnions and sockets, the trunnions and sockets having longitudinal movements.

4. In combination in an articulation, car platforms having trunnions with arcuate engaging faces adapted to permit vertical and horizontal movement of the car platforms, semi-circular receiving sockets for said trunnions adapted to permit of said respective platform movements, a socket plate carrier, yielding means between said sockets and said carrier for resisting the independent longitudinal movement of the trunnions and sockets, the trunnions and sockets having longitudinal movements, and means on the carrier for guiding the movement of the sockets.

5. In combination, in an articulation, car platforms having trunnions with engaging surfaces adapted to permit relative vertical and horizontal movement of said car platforms, socket plates for receiving said trunnions, a socket plate carrier, yielding means between said socket plates and said socket plate carrier for resisting independent longitudinal movement of said socket plates, and means on said socket plate carrier for guiding said socket plates for longitudinal movement.

6. In combination, car platforms having trunnions, independent sockets for said trunnions, said trunnions and sockets having longitudinal movements, a common socket carrier in which said sockets are mounted and yielding means for resisting the longitudinal displacement of the sockets with respect to said socket carrier.

7. In combination, in an articulation, a truck bolster, a socket plate carrier mounted on said truck bolster, socket plates yieldingly mounted in said socket plate carrier, and trunnions on adjacent car platforms adapted to be supported in the respective socket plates to bear against one another.

8. In a railway train, a truck common to adjacent end platforms of two cars, said platforms having trunnions adapted for engagement and relative vertical and lateral movement, and articulated couplings between said truck and said trunnions including resilient means adapted to take up slack between said trunnions, whereby, when the inertia of the foremost of said cars is overcome, forward movement thereof immediately takes place, followed thereafter by a forward movement of said other car, after the first-named car has acquired momentum.

9. In a railway train, a truck common to the adjacent ends of two cars, a center plate mounted on the truck, socket plates mounted on the center plate, and movable thereon, a trunnion carried by one car and adapted to operate in one socket plate, a trunnion carried by the other car adapted to operate in the other socket plate, and yielding means comprising springs between the socket plates and the center plate, whereby the inertia may be overcome and the forward movement of one car may take place first, and whereby the inertia of the other car may be overcome and its forward movement may take place thereafter.

10. In a railway train, a truck common to the adjacent ends of two cars, a center plate mounted on the truck, socket plates mounted on the center plate, and movable thereon, and a trunnion carried by each car and adapted to operate in one of the socket plates and yielding means between each socket plate and the center plate, whereby the inertia of the forward of the two cars is overcome and a forward movement of said forward car first takes place through the action of said yielding means, and whereby the inertia of the second car is thereafter overcome and its forward movement commences to take place through the action of its yielding means, after the first car has acquired momentum.

THEODORE H. SCHOEPF.
DAVID M. RITCHIE.